Patented Dec. 11, 1945

2,390,526

UNITED STATES PATENT OFFICE 2,390,526

BUTYROLACTONES AND METHODS OF PREPARING THEM

Robert C. Elderfield, New York, N. Y., and Elkan R. Blout, Cambridge, Mass., assignors to Eli Lilly and Company, Indianapolis, Ind, a corporation of Indiana No Drawing. Application September 11, 1943, Serial No. 502,022

16 Claims. (Cl. 260—239.5)

This invention relates to butyrolactones and more particularly to α-halo-β-substituted butyrolactones and to methods of preparing α-halo-β-substituted butyrolacetones and β-substituted-Δ$^{α,β}$-butyrolactones.

In the application Serial No. 384,588, filed on March 21, 1941, by Robert C. Elderfield, there are described methods of preparing synthetically β-substituted-Δ$^{α,β}$-butyrolactones. The methods described in that application are inadequate or unsatisfactory for producing butyrolactones which have been found to have marked cardiac activity. Specifically, it has been found that a hydroxy group is necessary on the 14 position of the cyclopentanoperhydrophenanthrene nucleus for cardiac action and since such a hydroxyl group is tertiary, it would not in many cases withstand the rather drastic treatment involved in the methods described in that application.

In accordance with this invention, β-substituted-Δ$^{α,β}$- butyrolactones may be prepared by a method which will not destroy the tertiary hydroxyl group, such as that contained in the butyrolactones possessing cardiac action. In this method α-halo-β-substituted butyrolactones are employed. These α-halo-β-substituted butyrolactones, which are new compounds, may be represented by the following formula:

(1) 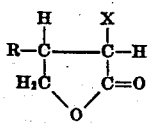

in which R is a monovalent radical of the group consisting of acyclic and carbocyclic radicals, which radical is linked through a saturated carbon atom of the radical to the β carbon atom of the butyrolactone nucleus, and X is a halogen selected from the class consisting of chlorine, bromine, and iodine. The carbon atom of the radical R through which the radical is linked to the butyrolactone nucleus does not have any unsaturated bonds attached to it. R may be a cyclopentanoperhydrophenanthrene nucleus containing none or one or more hydroxyl groups and none or one or more double bonds. The term, cyclopentanoperhydrophenanthrene, throughout the description and claims is used in a generic sense and that cyclopentanoperhydrophenanthrene nucleus may contain one or a plurality of the same or different substituents. Particularly it may contain one or a plurality of hydroxyl groups, including a tertiary hydroxyl group in the 14 position. R and X have the same meaning throughout the description of the invention.

The α-halo-β-substituted butyrolactones of this invention and their corresponding β-substituted-Δ$^{α,β}$-butyrolactones are prepared as follows:

An ester of the acid represented by the following formula:

(2) 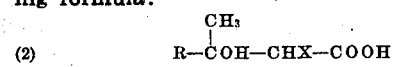

in which R is linked through a saturated carbon atom of that radical to the β carbon atom of the acid is treated with a solution of hydrogen bromide in a liquid saturated aliphatic acid. Preferably the ester is an alkyl ester, the alkyl radical having not more than five carbon atoms, such as the ethyl ester of the acid; and desirably the liquid saturated aliphatic acid does not contain more than five carbon atoms, such as acetic acid and propionic acid. The aliphatic acid is saturated with dry hydrogen bromide at approximately 0° C. The aliphatic acid and the ester of the acid noted in Formula 2 should be substantially free from water. Alternately sulfuric acid (concentration about 30 to 60 percent) may be used instead of the saturated aliphatic acid.

If the radical R contains an hydroxyl group, such as an hydroxyl group in the 3 position of a cyclopentanoperhydrophenanthrene nucleus, that hydroxyl group or groups should desirably be covered up by acylation with acetic anhydride, for example. In the event that the hydroxyl group does not withstand the action of the acid and a double bond is introduced into the nucleus, that double bond may be subsequently hydroxylated by any of the well known methods, such as by the use of osmic acid.

The mixture of hydrogen bromide and the ester is refluxed until a low boiling liquid begins to condense. The reflux condenser is then replaced by one adapted for distillation and the mixture is distilled. Alternate refluxing and distillation are continued for a period of from about 16 to 24 hours, after which time more liquid saturated aliphatic acid saturated with hydrogen bromide is added. Refluxing and distillation are continued for an additional period of from about 8 to 16 hours. During this period of refluxing and distillation, the α-halo-β-R-butyrolactone is formed and is contained in the residual mixture. The reaction which takes place may be represented as follows:

(3) 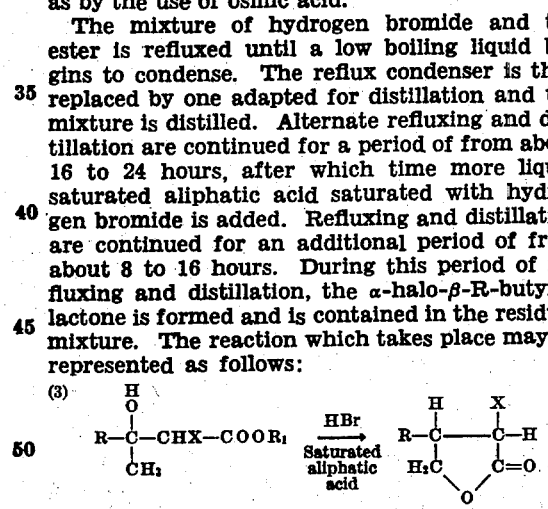

in which R$_1$ is a monovalent acyclic or carbocyclic radical and preferably an alkyl group having not more than 5 carbon atoms.

The residual mixture which contains the α-halo-β-R-butyrolactone is poured into a large amount of ice and water and extracted with ether. The ether extract is washed free from acid and dried. The residue, after removal of the solvent, is distilled under reduced pressure.

The distillate comprises α-halo-β-R-butyrolactone.

The ester of the acid represented by Formula 2 above may be prepared by the method described by Darzens and Darzens and Levy [Compt. rend., 203, 1374 (1936) and Compt. rend., 204, 272 (1937)].

To prepare β-R-Δ^α,β-butyrolactone from the corresponding α-halo-β-R-butyrolactone, the α-halo-β-R-butyrolactone is de-hydrohalogenated. The de-hydrohalogenation is most conveniently achieved by treating the α-halo-β-R-butyrolactone with an anhydrous alkali metal acetate, such as potassium acetate, sodium acetate or lithium acetate, in a liquid saturated aliphatic acid such as acetic acid, propionic acid or butyric acid. This de-hydrohalogenation should be performed in the substantial absence of water. Desirably, the alkali metal acetate is potassium acetate and the liquid saturated aliphatic acid is glacial acetic acid.

While other agents may be utilized for the dehydrohalogenation, they are not nearly so effective as the alkali metal acetate and the liquid saturated aliphatic acid. For example, when quinoline is utilized, extensive resinification takes place. Lower-boiling dimethylaniline results in only partial removal of the hydrogen halide and leads to a mixture of unsaturated lactone and unchanged halo lactone together with condensation products of obscure nature.

Accordingly, the de-hydrohalogenation is effected by heating to boiling under reflux a mixture of a α-halo-β-R-butyrolactone, an anhydrous alkali metal acetate, and a liquid saturated aliphatic acid. The mixture is refluxed for a period of approximately 8 to 16 hours. During this time the β-R-Δ^α,β-butyrolactone is formed. The reaction which takes place may be represented as follows:

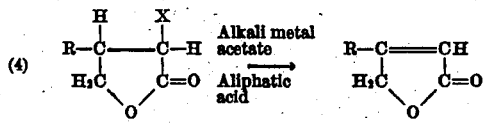

After refluxing, the mixture is poured into ice and water and extracted with ether. The ether extract is washed and dried. The solvent is removed and the residue is distilled under reduced pressure. The distillate comprises β-R-Δ^α,β-butyrolactone.

Typical examples of the compositions and methods of this invention are as follows:

All temperatures are in the Centigrade scale and all melting and boiling points are corrected for stem exposure.

*Example 1.—Preparation of α-chloro-β-cyclohexylbutyrolactone and β-cyclohexyl-Δ^α,β-butyrolactone*

Ethyl α-chloro-β-hydroxy-β-cyclohexylbutyrate is first prepared in accordance with the method of Darzens by condensing ethyl dichloroacetate with methyl cyclohexyl ketone in the presence of magnesium amalgam. The magnesium amalgam for this purpose is prepared by heating 12.5 g. (0.5 mole) of magnesium turnings with 625 g. of dry mercury in a one-liter round bottom flask. It is found to be unnecessary to carry out the amalgamation under an atmosphere of hydrogen as suggested by Darzens. To the well cooled amalgam is added a mixture of 400 cc. of anhydrous ether, 63 g. (0.5 mole) of cyclohexylmethylketone, and 90 g. (0.58 mole) of ethyl dichloroacetate all at one time. The stoppered flask is then shaken by hand until the amalgam has completely dissolved, the temperature being controlled so that it does not rise above 30°. Mechanical shaking for one hour completes the reaction to form ethyl α-chloro-β-hydroxy-β-cyclohexylbutyrate. The solution is then poured into an excess of ice and concentrated hydrochloric acid and the resulting mixture is extracted with ether. After washing the ether extract free from acid, first with a sodium carbonate solution and then with water and drying over anhydrous magnesium sulfate, the residue, after evaporation of the ether, is distilled under reduced pressure. The distillate comprises ethyl-α-chloro-β-hydroxy-β-cyclohexylbutyrate.

To prepare α-chloro-β-cyclohexylbutyrolactone a solution of 90 g. of ethyl α-chloro-β-hydroxy-β-cyclohexylbutyrate in 120 cc. of glacial acetic acid is saturated with dry hydrogen bromide at 0° to which is added 350 cc. of glacial acetic acid. This mixture is then refluxed. After about a half hour a low boiling liquid begins to condense. The reflux condenser is replaced by one set downward for distillation and the distillate, boiling up to 62°, is collected. Alternate refluxing and distilling are then continued for about 24 hours, during which time at the end of 16 hours 25 cc. more of glacial acetic acid, saturated with hydrogen bromide, is added. The residual mixture is then poured into a large amount of ice and water and extracted with ether. After washing the ether extract free from acid and drying, the residue, after removal of the solvent, is distilled under reduced pressure. The distillate comprises α-chloro-β-cyclohexylbutyrolactone. The α-chloro-β-cyclohexylbutyrolactone is a heavy, mobile, yellow oil which boils at about 131–135° at 0.9 mm. On standing, the chlorolactone crystallizes as stout white prisms which are very soluble in the usual organic solvents. After crystallization from isopentane, the substance melts at about 131–131.5°.

To prepare β-cyclohexyl-Δ^α,β-butyrolactone, a mixture of 6 g. of α-chloro-β-cyclohexylbutyrolactone, 12 g. of anhydrous potassium acetate and 15 cc. of glacial acetic acid is heated to boiling under reflux. A copious precipitate of potassium chloride separates almost immediately and heating is continued for about 12 hours. During this time the β-cyclohexyl-Δ^α,β-butyrolactone is formed. The mixture is then poured into ice and water and extracted with ether. After washing and drying the extract, the solvent is removed and the residue is distilled under reduced pressure. The distillate comprises β-cyclohexyl-Δ^α,β-butyrolactone.

*Example 2.—Preparation of α-bromo-β-cyclohexylbutyrolactone and β-cyclohexyl-Δ^α,β-butyrolactone*

Ethyl - α-bromo-β-hydroxy-β-cyclohexylbutyrate is first prepared in the same manner as for the preparation of ethyl-α-chloro-β-hydroxy-β-cyclohexylbutyrate described in Example 1 except that ethyl dibromoacetate is used instead of ethyl dichloroacetate. The α-bromo-β-cyclohexylbutyrolactone is produced from this ethyl-α-bromo-β-hydroxy-β-cyclohexylbutyrate in the same manner as the corresponding chloro-analogue is produced, as described in Example 1.

To prepare β-cyclohexyl-Δ^α,β-butyrolactone, a mixture of 5 g. of α-bromo-β-cyclohexylbutyrolactone, 10 g. of anhydrous potassum acetate, and 15 cc. of glacial acetic acid is heated to boiling under reflux. A copious precipitate of potassium bromide separates almost immediately, but heating is continued for 12 hours. The mixture is then worked up as described in Example 1 to obtain the β-cyclohexyl-Δ^{α,β}-butyrolactone.

*Example 3.—Preparation of α-chloro-β-etiocholanylbutyrolactone and 3,14 bisdesoxythevetigenin (3,14-bisdesoxydigitoxigenin)*

Ethyl α-chloro-β-hydroxy-β-etiocholanylbutyrate is first prepared by adding to a flask provided with a stopper a mixture of 1 g. of etiocholanyl methyl ketone in 50 cc. of anhydrous ether and 2 g. of ethyl dichloroacetate to magnesium amalgam prepared from 0.25 g. of magnesium turnings and 13 g. of mercury. The stoppered flask is then shaken by hand until the amalgam has completely dissolved, the temperature being kept below about 30°. Mechanical shaking for one hour completes the reaction. The reaction mixture is then poured into an excess of ice and hydrochloric acid and extracted thoroughly with ether. The ether extract is washed free from acid, first with sodium carbonate solution and then with water. The ether extract is then dried over anhydrous magnesium sulfate, and the ether is removed. The residue, a viscous, light yellow oil, which comprises ethyl α-chloro-β-etiocholanylbutyrate, does not crystallize but is used for the next step.

A solution of 250 mg. of ethyl α-chloro-β-hydroxy-β-etiocholanylbutyrate in 1 cc. of glacial acetic acid which has been previously saturated with dry hydrogen bromide at 0° and 4 cc. of glacial acetic acid is refluxed for 20 hours. The residual mixture is then poured into a large amount of ice and water and extracted with ether. After washing the ether extract free of acid and drying, removal of the solvent yields a heavy yellow oil which crystallizes on triturating with petroleum ether. This heavy yellow oil comprises α-chloro-β-etiocholanylbutyrolactone and gives no nitroprusside (legal) test. The α-chloro-β-etiocholanylbutyrolactone may be represented by the following formula:

(5) 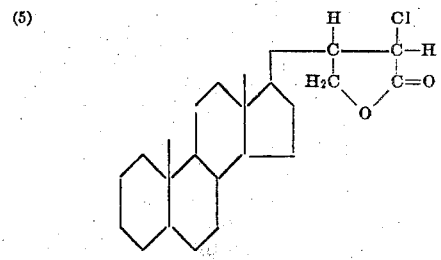

To prepare 3,14-bisdesoxythevetigenin, a mixture of 100 mg. of α-chloro-β-etiocholanylbutyrolactone, 1 g. of anhydrous potassium acetate and 1 g. of glacial acetic acid is refluxed for 5 hours, during which time precipitation of potassium chloride occurs. The mixture is then poured into ice and water and extracted with ether. The ether extract is washed free from acid with sodium bicarbonate and then water, dried, and the ether removed. The residue, which comprises 3,14-bisdesoxythevetigenin, on standing in the refrigerator crystallizes. On recrystallization from alcohol, stout needles are obtained which melt at about 167–168° and give a positive nitroprusside test.

*Example 4.—Preparation of α-chloro-β-3(β)-acetoxy etiocholanylbutyrolactone and 14-desoxythevetigenin*

Pregnanol-3(β)-one-20-acetate is prepared by refluxing 5 g. of pregnanol-3(β)-one-20 with 25 cc. of acetic anhydride for 30 minutes. On cooling, the acetate crystallizes readily.

Ethyl α-chloro-β-hydroxy-β-3(β)-acetoxy etiocholanylbutyrate is prepared by adding a solution of 5 g. of pregnanol-3(β)-one-20-acetate in 50 cc. of anhydrous ether and 9 g. of ethyl dichloroacetate to an amalgam produced from 1.25 g. of magnesium turnings and 62.5 g. of mercury. The mixture is then shaken until all the amalgam has dissolved and there is no further evidence of a reaction. During this time the temperature is controlled so that it does not rise above about 30°. After shaking for one hour on a mechanical shaker, the mixture is poured into a mixture of ice and hydrochloric acid. The resulting mixture is extracted with ether and the ether extract washed and dried in the same manner as ethyl α-chloro-β-hydroxy-β-butyrate in Example 2. Upon removal of the ether, a yellow oil, which comprises ethyl α-chloro-β-hydroxy-β-3(β)-acetoxy etiocholanylbutyrate, is obtained. It is used for the next step without further purification.

α-Chloro-β-3(β)-acetoxy etiocholanylbutyrolactone is prepared by refluxing a solution of 5 g. of the ethyl-α-chloro-β-hydroxy-β-3(β)-acetoxy etiocholanylbutyrate in 12 cc. of glacial acetic acid which has been previously saturated with dry hydrogen bromide at 0° and 35 cc. of glacial acetic acid. The mixture is alternately refluxed and distilled as described in Example 1 for the preparation of α-chloro-β-cyclohexylbutyrolactone. At the end of about 24 hours the mixture is poured into a large amount of ice and water and extracted with ether. The ether extract is washed free of acid, dried, and the ether removed. The residual light brown oil is taken up in 100 cc. of a 1:1 mixture of benzene and isopentane. This solution is passed through a column of 50 g. of aluminum oxide (Brockmann), and the column is washed with 200 cc. of the same solvent. The colorless solution which passes through the column is concentrated, leaving the α-chloro-β-3(β)-acetoxy etiocholanylbutyrolactone as a crystalline residue.

The α-chloro-β-3(β)-acetoxy etiocholanylbutyrolactone may be represented by the following formula:

(6) 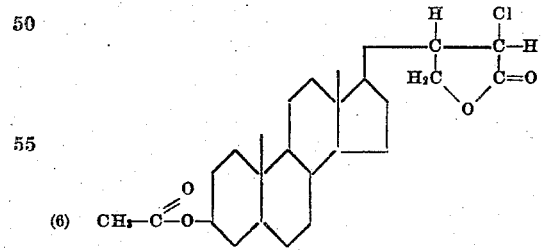

14-desoxythevetigenin acetate is prepared by reacting 500 mg. of α-chloro-β-3(β)-acetoxy etiocholanylbutyrolactone with 1 g. of anhydrous potassium acetate and 2 cc. of glacial acetic acid. After refluxing for about 3 hours, the mixture is poured into ice and extracted with ether. The ether extract is washed free of acid, dried, and the solvent removed. The residual pale yellow oil, which comprises 14-desoxythevetigenin acetate, crystallizes on adding a few drops of alcohol. After several recrystallizations from alcohol, the acetate forms rectangular platelets which melt at about 197–198° and gives a strong positive nitroprusside (legal) test.

14-desoxythevetigenin is produced by refluxing for 2.5 hours a mixture of 35 mg. of 14-desoxythevetigenin acetate, 2 cc. of alcohol, 1.6 cc. of water and 0.4 cc. of concentrated hydrochloric acid. Addition of water causes the formation of a crystalline precipitate which is extracted with chloroform. After washing and drying the chloroform extract, the solvent is removed under reduced pressure, leaving an oil which crystallizes on the addition of a few drops of ethyl acetate. The 14-desoxythevetigenin recrystallizes from a mixture of ethyl acetate and isopentane, or from dilute alcohol, and forms fine needles which melt at about 220–222°. The substance gives a strong positive legal test and an emerald green, as well as a blue, ring in the Keller-Kiliani test.

What is claimed is:

1. An α-halo-β-substituted-butyrolactone which is represented by the following formula:

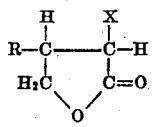

in which R is a monovalent radical of the group consisting of acyclic and carbocyclic radicals, which radical is linked through a saturated carbon atom of said radical to the β-carbon atom of the butyrolactone nucleus, and X is a halogen selected from the class consisting of chlorine, bromine, and iodine.

2. An α-halo-β-substituted-butyrolactone in accordance with claim 1, in which R is a cyclopentanoperhydrophenanthrene radical.

3. An α-halo-β-substituted-butyrolactone in accordance with claim 1, in which R is a perhydroaromatic radical.

4. An α-halo-β-substituted-butyrolactone in accordance with claim 1, in which R is a cyclopentanoperhydrophenanthrene radical and X is chlorine.

5. The process of preparing a β-substituted-Δ$^{\alpha,\beta}$-butyrolactone which comprises treating an ester of the acid represented by the following formula:

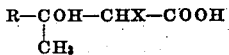

in which R is a radical of the group consisting of acyclic and carbocyclic radicals, which radical is linked through a saturated carbon atom of said radical to the β-carbon atom of the acid, and X is a halogen selected from the class which consists of chlorine, bromine, and iodine, with a solution of hydrogen bromide in a liquid saturated aliphatic acid to form an α-halo-β-R-butyrolactone and heating the resulting α-halo-β-R-butyrolactone with an alkali metal acetate in a saturated liquid aliphatic acid.

6. The process of preparing a β-substituted-Δ$^{\alpha,\beta}$-butyrolactone in accordance with claim 5, in which R is a cyclopentanoperhydrophenanthrene radical.

7. The process of preparing a β-substituted-Δ$^{\alpha,\beta}$-butyrolactone in accordance with claim 5, in which R is a cyclopentanoperhydrophenanthrene radical and the alkali metal acetate is anhydrous potassium acetate.

8. The process of preparing a β-substituted-Δ$^{\alpha,\beta}$-butyrolactone in accordance with claim 5, in which R is a cyclopentanoperhydrophenanthrene radical, the alkali metal acetate is anhydrous potassium acetate, and the liquid aliphatic acid is a glacial acetic acid.

9. The process of preparing a β-substituted-Δ$^{\alpha,\beta}$-butyrolactone which comprises lactonizing an ester of the acid represented by the following formula:

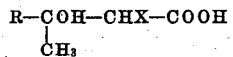

in which R is a radical of the group consisting of acyclic and carbocyclic radicals, which radical is linked through a saturated carbon atom of said radical to the β carbon atom of the acid, and X is a halogen selected from the class consisting of chlorine, bromine, and iodine, and de-hydrohalogenating the resulting lactone.

10. The process of preparing a β-substituted-Δ$^{\alpha,\beta}$-butyrolactone in accordance with claim 9, in which R is a cyclopentanoperhydrophenanthrene radical.

11. The process of preparing an α-halo-β-substituted-butyrolactone which comprises lactonizing an ester of the acid represented by the following formula:

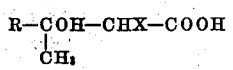

in which R is a radical of the group consisting of acyclic and carbocyclic radicals, which radical is linked through a saturated carbon atom of said radical to the β carbon atom of the acid, and X is a halogen selected from the class consisting of chlorine, bromine, and iodine.

12. The process of preparing an α-halo-β-substituted butyrolactone in accordance with claim 11, in which R is a cyclopentanoperhydrophenanthrene radical.

13. The process of preparing a β-substituted-Δ$^{\alpha,\beta}$-butyrolactone which comprises de-hydrohalogenating an α-halo-β-substituted-butyrolactone which is represented by the following formula:

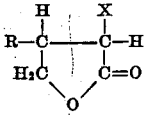

in which R is a radical of the group consisting of acyclic and carbocyclic radicals, which radical is linked through a saturated carbon atom of said radical to the β carbon atom of the butyrolactone nucleus, and X is a halogen selected from the class consisting of chlorine, bromine, and iodine.

14. The process of preparing a β-substituted-Δ$^{\alpha,\beta}$-butyrolactone which comprises treating an α-halo-β-substituted-butyrolactone which is represented by the following formula:

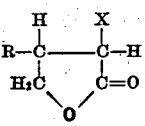

in which R is a cyclopentanoperhydrophenanthrene radical which is linked through a saturated carbon atom of said radical to the β-carbon atom of the butyrolactone nucleus and X is a halogen selected from the class consisting of chlorine, bromine, and iodine, with an alkali metal acetate in a saturated liquid aliphatic acid.

15. The process of preparing a β-substituted-Δ$^{\alpha,\beta}$-butyrolactone in accordance with claim 14, in which the alkali metal acetate is anhydrous potassium acetate and the saturated liquid aliphatic acid is glacial acetic acid.

16. α-chloro-β-cyclohexylbutyrolactone.

ROBERT C. ELDERFIELD.
ELKAN R. BLOUT.